UNITED STATES PATENT OFFICE.

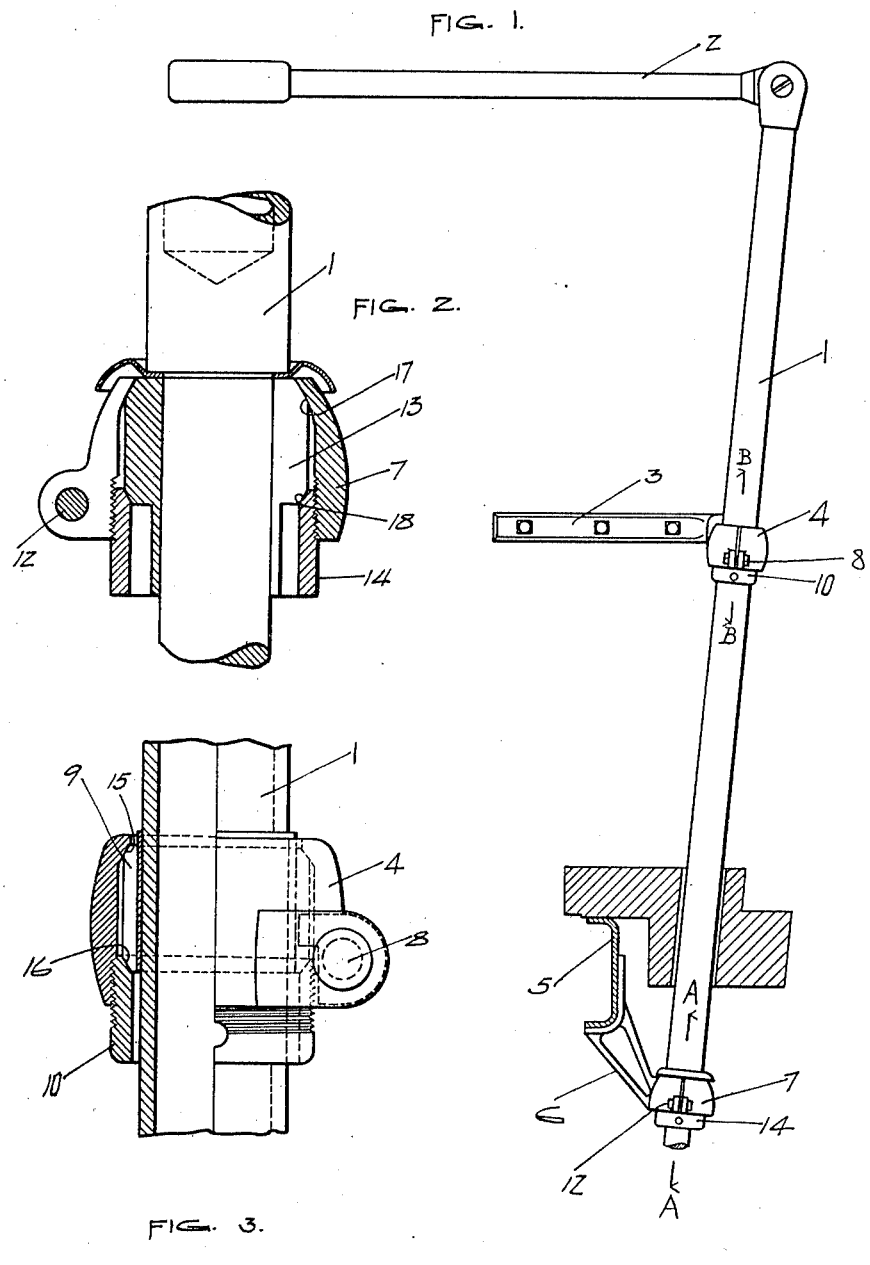

DE WITT C. COOKINGHAM AND JOHN H. HERTNER, OF CLEVELAND, OHIO, ASSIGNORS TO THE RAUCH AND LANG CARRIAGE COMPANY, OF CLEVELAND, OHIO, A CORPORATION OF OHIO.

STEERING-POST SUPPORT.

1,066,584.  Specification of Letters Patent.  Patented July 8, 1913.

Application filed October 20, 1910. Serial No. 588,036.

*To all whom it may concern:*

Be it known that we, DE WITT C. COOKINGHAM and JOHN H. HERTNER, citizens of the United States, and residents of Cleveland, county of Cuyahoga, and State of Ohio, have jointly invented a new and useful Improvement in Steering-Post Supports, of which the following is a specification, the principle of the invention being herein explained and the best mode in which we have contemplated applying that principle, so as to distinguish it from other inventions.

Our invention relates in general to means for mounting the bearings for a rotatable shaft and has particular regard for the bearings for a steering post in an automobile. In such case one bearing is usually mounted on the vehicle frame and the other on the body and as the frame and body are subjected to some relative movement, it is extremely difficult to maintain two rigid bearings in accurate alinement.

The general object of our invention therefore, is to provide self-alining bearings for a steering post, and the invention further provides means for taking up the wear of the bearing.

The annexed drawing and the following description set forth in detail certain mechanism embodying the invention, such disclosed means constituting, however, but one of various mechanical forms in which the principle of the invention may be used.

In said annexed drawing:—Figure 1 is a front elevation partly in section and partly broken away, of a steering post mounted in accordance with our invention; Fig. 2 is a section on the line A—A in Fig. 1; and Fig. 3 is a section on the line B—B in Fig. 1.

The usual steering post such as is ordinarily used in electric vehicles, is indicated by the numeral 1 and bears at its upper end the usual pivoted handle portion 2, while its lower end is designed to be connected with the steering knuckle. A bracket 3 is secured to any suitable portion of the body, usually to the seat of the vehicle, and a bearing 4 is attached rigidly to bracket 3. The frame 5 of the vehicle, upon which frame the body is mounted, has a bracket 6 secured to it and rigidly mounted upon the bracket 6 is a bearing 7 in substantial alinement with the bearing 4. It is through the two bearings 4 and 7 that the steering post 1 extends and it is the constant alinement of these two bearings which the present invention is designed to secure.

The bearing 4 comprises the bearing member 4 proper which is split longitudinally and a bolt 8 is threaded through the bearing 4 on both sides of the split therein, so that the space between the adjacent edges of the bearing member may be made larger or smaller as desired by loosening and tightening the bolt 8. The interior surface of the member 4 is formed with the partly spherical surface 15 and a nut 10 is threaded into the member 4 and is formed interiorly with the partly spherical surface 16. A sleeve 9 is disposed within the member 4 and is formed exteriorly with partly spherical surfaces contacting with the surfaces 15 and 16, the sleeve 9 being split longitudinally.

The bearing 7 comprises the bearing member proper 7 which is split longitudinally and provided with the clamp bolt 12 adapted to make the space between the adjacent edges of the member 7 larger or smaller as desired. The member 7 is formed interiorly with a partly spherical surface 17, while a nut 14, which is threaded into member 7 is formed interiorly with a partly spherical surface 18. A sleeve 13 which is longitudinally split is held within the member 7 and is formed exteriorly with partly spherical surfaces contacting with the surfaces 17 and 18. The steering post 1 extends through the sleeves 9 and 13.

Obviously the respective sleeves are free to move within the member and retaining nut in such a way as to vary the line of their axes, for the contacting spherical surfaces serve to make of the three parts practically a roller bearing. This freedom of movement of the sleeves within the bearing members and nuts serves to maintain the axes of the sleeves of the two bearings in accurate alinement despite any relative movement of the vehicle frame and the body. The compensating movement of the bearings need be only very slight, for ordinarily the two bearings are from 15 to 16 inches apart and an adjustment of $\frac{3}{32}$ of an inch is all that is ever required to aline the bearings. We have further provided for taking up any wear developed in the bearing. If the shaft becomes loose in the sleeve, the sleeve, being split longitudinally, may be tightened upon the shaft by screwing up the nut and the bearing member proper may be then tightened upon the nut by means of the clamp bolt.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. A bearing member adapted to support a shaft, comprising a split tubular member formed with a concave bearing surface at one end and threaded interiorly at the other end; a bolt for holding said split member together; a nut threaded into said member, said nut being formed with a concave bearing surface facing the concave bearing surface of the member; and a sleeve, of lesser external diameter than the inside diameter of said member, within the same, thereby being spaced therefrom, said sleeve being formed at its respective ends with complementary bearing surfaces contacting the concave bearing surfaces of said member and said nut, the spacing of said sleeve from said member, except at such bearing surfaces, permitting adjustment of the axis of said sleeve.

2. A bearing member adapted to support a shaft, comprising a split tubular member formed with a spherical bearing surface at one end and threaded interiorly at the other end, said member having apertured projecting lugs mounted thereon; a bolt adapted to engage said lugs thereby holding said member together; a nut threaded into said member, said nut being formed with a spherical bearing surface facing the spherical bearing surface of the member; and a longitudinal split sleeve, of lesser external diameter than the inside diameter of said member, within the same, thereby being spaced therefrom, said sleeve being formed at its respective ends with complementary bearing surfaces contacting the spherical bearing surfaces of said member and said nut, the spacing of said sleeve from said member, except at such bearing surfaces, permitting adjustment of the axis of said sleeve.

Signed by us, this 17th day of October, 1910.

DE WITT C. COOKINGHAM.
JOHN H. HERTNER.

Attested by—
 ANNA L. GILL,
 JNO. F. OBERLIN.